INVENTOR.
HARRY I. SHRUBSALL

Oct. 6, 1964 H. I. SHRUBSALL 3,152,019
ARC WELDING, COMPOSITIONS AND METHOD OF MAKING SAME
Filed Sept. 16, 1960 4 Sheets-Sheet 2

TYPICAL EXAMPLE OF PREBONDED METALLIC ADDITIVE AS A LATE FURNACE ADDITION (MAG. 590X)

WHITE:
METALLIC ADDITIVE DISPERSED THROUGHOUT FUSED WELDING COMPOSITION.

BACKGROUND:
FUSED WELDING COMPOSITION.

*INVENTOR*
HARRY I. SHRUBSALL

BY Barnwell R. King
*ATTORNEY*

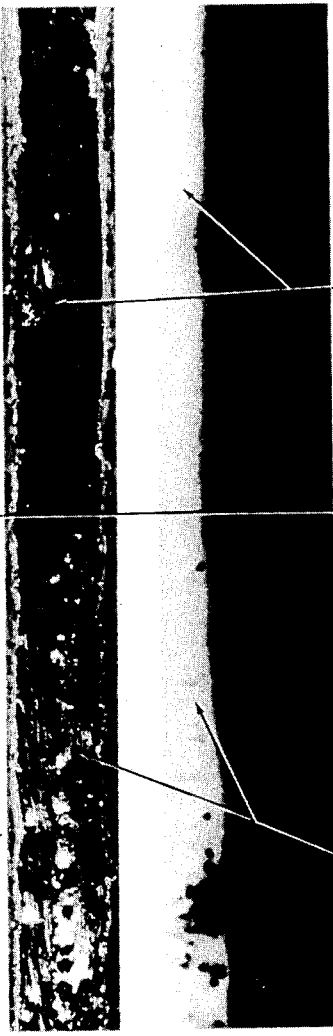

3,152,019
ARC WELDING, COMPOSITIONS AND METHOD
OF MAKING SAME
Harry I. Shrubsall, Scotch Plains, N.J., assignor to Union
Carbide Corporation, a corporation of New York
Filed Sept. 16, 1960, Ser. No. 56,513
9 Claims. (Cl. 148—26)

This invention relates to welding compositions containing predominantly fused material for submerged melt electric arc welding, and more particularly to ways of preparing such compositions as well as the compositions per se.

The invention provides unfused fluxing material in the form of a dry agglomerate composed of at least one metallic deoxidizer, a non-metallic carrier and a binder. In some cases the latter two materials are combined in one material such as sodium silicate. Such unfused fluxing material is added to a known fused-type submerged melt welding composition, either mechanically, or as a late furnace addition, and results in an improved weld in that no objectionable agglomeration of the metallic particles takes place even in the case of metallics and carriers of widely differing melting points.

It has been common practice for some time, to add certain types of metallic and non-metallic materials to welding compositions in order to obtain improved results in submerged melt welding. Better weld surface appearance, together with improved mechanical properties, have become apparent as a result of such additions. The resultant product, however, is of such a character that it imposes severe restrictions upon the efficiency of the submerged melt process, because the composition tends to segregate the deoxidizers from the basic composition.

For alleviating such difficulty, an additive was prepared by first fusing a deoxidizer and a carrier, and then crushing and sizing the solidified product. Subsequently, the finely crushed material was added as a late furnace addition into the molten basic welding composition just before pouring. Experiments with such product indicated that such method of producing submerged melt welding composition, because the even dispersion of metallic particles, produced a far superior weld than was possible prior thereto.

A limitation of such prior process, however, rests with the inability to successfully fuse materials having relatively high melting points together with those common materials having a substantially lower melting point. As an example, if instead of fusing ferro-silicon and calcium fluoride (melting point 1360 degs. C.) periclase is substituted for the calcium fluoride, it is impractical to fuse such materials because of the relatively high melting point (2800 degs. C.) of periclase.

To effectively supplement such process, a desirable remedy would lie with some method capable of taking various elements or combinations thereof, having different melting points and being able to unite them in a simpler, faster, and more economical way. The basic object of this invention is to provide such a method.

Another object is to provide an improved submerged melt welding composition containing metallic particles consisting of a suitable metallic deoxidizer bonded together with a non-metallic carrier randomly dispersed in the basic welding composition, so as to prevent the metallic particles from agglomerating.

Another object of the invention is to provide a novel unfused fluxing material for metal arc welding in the form of a dry agglomerate consisting of at least one metallic deoxidizer and a suitable binder.

According to the invention the welding composition additive is composed of a metallic deoxidizer bonded together with a suitable carrier. Initially, the metallic deoxidizer is thoroughly mixed with, and bonded to, the carrier and is in the form of a wet, cohesive mass, similar in texture to wet cement. Such mass is put in a suitable container for drying, such as a rotary kiln. Subsequently, all of the unwanted and excessive moisture is removed and the product is dried, crushed, and graded to a suitable mesh size. At this point, the additive is ready for introduction into the basic welding composition.

The use of bonded additives rather than those which are fused permits the use of suitable metallic deoxidizers together with various carriers and thereby completely eliminates the differential in melting points of the constituents as a factor to be contended with. For example, one may visualize the use of ferro-silicon suitably bonded to cellulose flour as being a suitable additive for certain welding compositions. On the other hand, where the conditions warrant, powdered ferro-silicon bonded with granulated carbon, produces an additive capable of delivering both a deoxidizer as well as carbon to the welding composition.

A prescribed mixture of silico-manganese and magnesium oxide (periclase) bonded together with the correct quantity of sodium silicate or any other useable bonding agent (dextrose, corn starch, Portland cement, sodium silicate, etc.), may be used to produce the additive. In like manner, other deoxidizers such as ferro-silicon and Alsifer and/or combinations thereof, bonded together with suitable carriers as bauxite ($Al_2O_3$) also yield acceptable additives.

The prebonded additive is selected to have essentially the same specific gravity as that of the basic welding composition, so that segregation of the constituents is avoided. On the other hand, if a metallic were to be mixed with the composition without the benefit of prebonding, gross segregation results because of the inequality in the specific gravity of such materials and thus nonuniform process characteristics would result.

The prebonded additive may be introduced into the basic welding composition by mechanical mixing, or as a late furnace addition. The invention thus provides highly flexible and effective ways for obtaining an improved metal welding composition.

In the drawings:

FIGS. 5, 6, 9 and 10 are photographs in perspective of welds made prior to, and with the invention, respectively:

FIGS. 7 and 11 are photographs in top plan of such "before" and "after" welds; and FIGS. 8 and 12 are X-ray photographs of such welds in cross section.

Finely divided SiMn and MgO, after being thoroughly dry blended, were united with a suitable bonding material, such as Portland cement, starch, molasses, sodium silicate, etc. When mixing was completed, the product was dried for approximately 1 hr. at 750 degs. F. and thereafter, the resultant mass was crushed and sized, and in such condition was ready for mechanical mixing with the prefused basic welding composition.

Typical analyses of the additive and basic compositions are as follows:

| Typical analysis of Prebonded Additive (Before Drying) | Percent Constituent | Typical Analysis of Basic Composition | Percent Constituent |
|---|---|---|---|
| SiMn | 42.0 | MnO | 41.0 |
| MgO | 42.0 | $SiO_2$ | 40.0 |
| "N" Brand Sodium Silicate | 12.7 | $Al_2O_3$ | 4.0 |
| Water | 3.3 | $CaF_2$ | 5.0 |
|  |  | CaO | 5.0 |
|  |  | $Na_2O$, $TiO_2$ and other incidentals | Balance |

The final product was composed of a mixture of approximately 90 percent of basic welding composition thoroughly mixed and dry-blended with about 10 percent of the prebonded silico-manganese, magnesium oxide material.

Figure 1:
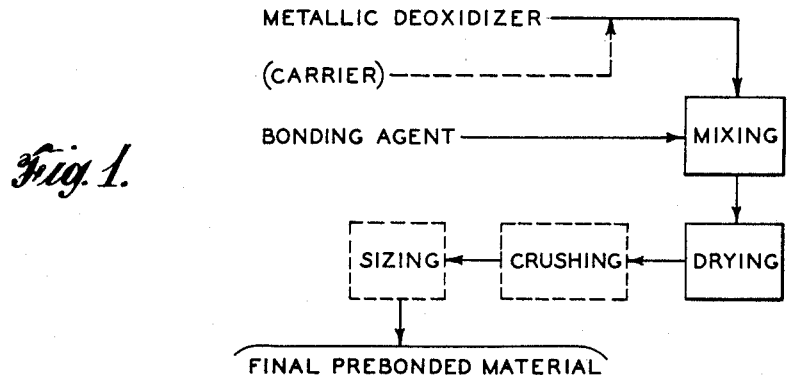
FIG. 1 is a flow diagram illustrating one method of making prebonded material of the invention.
Figure 2:
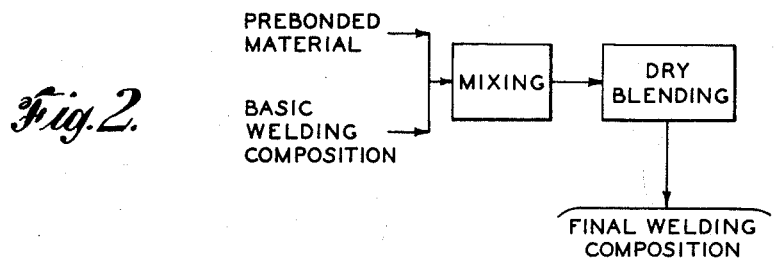
FIG. 2 is a flow diagram illustrating the way the prebonded additive is combined with a basic welding composition by mechanical mixing.
Figure 3:
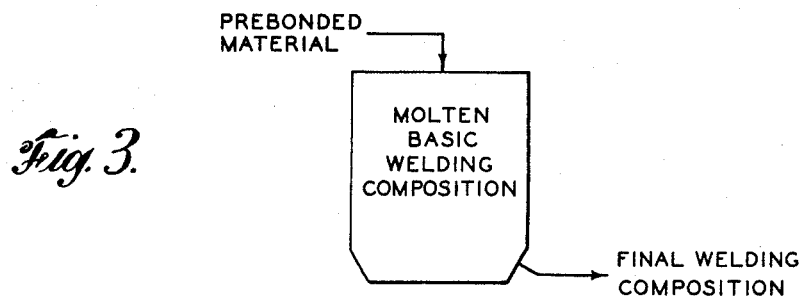
FIG. 3 is a flow diagram of the way the prebonded additive is combined with basic welding composition as a late furnace addition.
Figure 4:
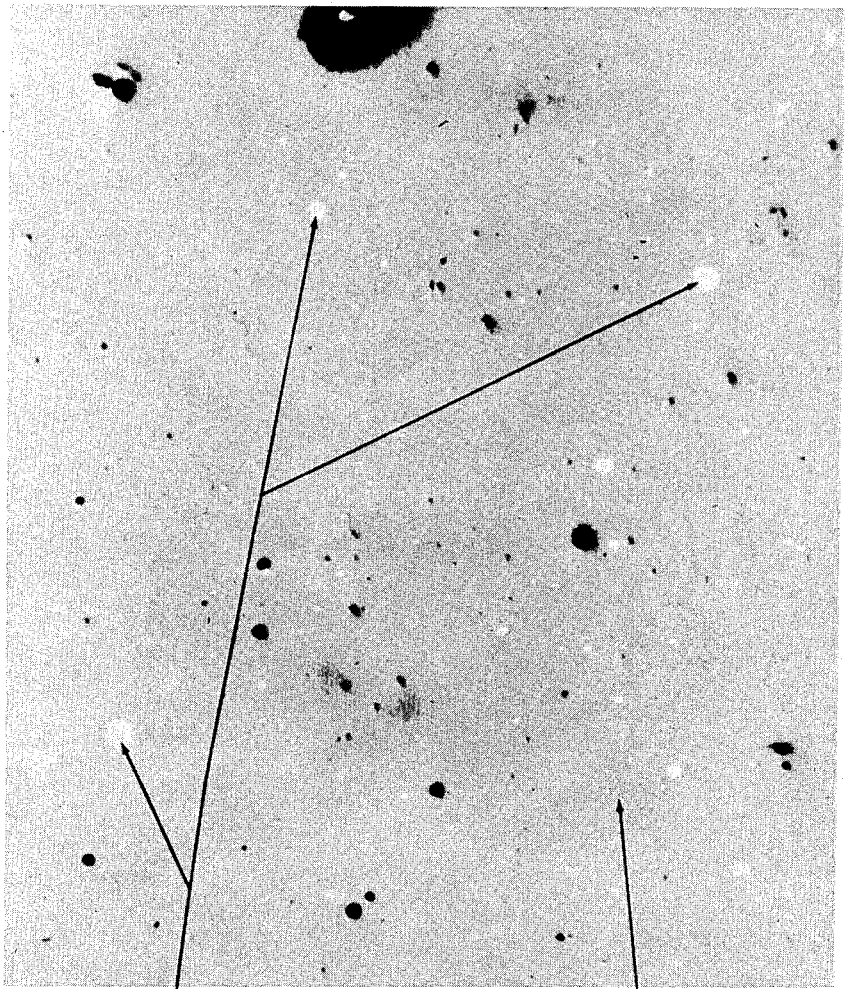
FIG. 4 is a micro-photographic cross-sectional view of a composition containing a prebonded metallic additive as a late furnace addition.

Prebonded deoxidizers of the invention, as an alternative to the mechanically mixing operation, may be added during the furnacing operation when making the basic fused compositions, FIG. 3. This prebonded additive can be introduced into the molten bath several ways; as for example, by a gravity fed dispenser, gas injector means, or by placing the additive on top of the molten bath and subsequently dividing throughout the molten mass. This phase of the process takes place just prior to tapping the final furnaced product. After having been assimilated into the composition, the deoxidizer is finely dispersed and suspended throughout the entire molten mass. Subsequently, the molten welding composition, as tapped, is composed of the basic welding composition constituent fortified with a sufficient quantity of finely dispersed metallic deoxidizers, as shown in FIG. 4. At this point, the entire product is graded and sized and is ready for use as submerged melt welding composition.

While it is possible to add ferro-silicon (FeSi) to the molten bath without the benefit of prebonding, experiments indicate that, while some of the metallic additive is oxidized by the bath, the portion that is not oxidized agglomerates and collects at the furnace floor. Prebonding of the metallic additive according to the present invention alleviates such difficulty and produces a randomly distributed mass.

The metallic oxidizer and the non-metallic carrier are thoroughly dry-blended before adding the bonding material such as silicate of soda, dextrose, molasses, or Portland cement. When mixing is completed, the finished product is dried for 1 hr. in an oven at 750 degs. F. The agglomerated mass is then crushed, sized, less than 100 x D inclusive, preferably 20 x D, and added to the basic submerged melt welding composition. The final submerged melt welding composition consists preferably of a mixture of 85% to 98% of basic welding composition, together with 2%–15% of the prebonded additive.

In the case of making the final product by adding the agglomerate of the invention as a late furnace addition, the constituents of the basic composition are fed into an arc furnace and heated to the molten state (approximately 2600 degs. F.). The power to the furnace is then reduced or shut off, to prevent overheating, and the prebonded additive is introduced into the molten mass. Next, the bath is stirred so as to distribute the additive randomly throughout the bath. The resulting molten material is then cast, crushed and suitably sized from 80 x D to 20 x D.

The following table is a typical example:

| Prebonded Additive | Percent Constituent | Typical Final Pro. | Percent Constituent |
|---|---|---|---|
| (50%) FeSi (80 x D) | 33.6 | MnO | 38.0 |
| MgO | 50.5 | $SiO_2$ | 38.0 |
| $Na_2SiO_3$ | 12.6 | $Al_2O_3$ | 4.0 |
| $H_2O$ | 3.3 | $CaF_2$ | 3.7 |
|  |  | MgO | 5.0 |
|  |  | FeO | 1.1 |
|  |  | CaO | 5.0 |
|  |  | FeSi | 4.5 |
|  |  | $Na_2O$ | 0.7 |

FIGS. 5–8 show a lap fillet weld made with basic welding composition where, in one instance, rust powder was added to the joint seam and in the other, mill scale is added to the joint seam. Such contaminants were added to provide a suitable standard for the evaluation of welding compositions. In both instances, however, a metallic deoxidizer was not present in the welding composition and it is apparent that severe porosity results. On the other hand, the joint shown in FIGS. 9–12 was welded under the exact same conditions as those noted in the previous instance with the exception of the fact that a metallic deoxidizer was added to the basic welding composition.

The use of an enriched welding composition appreciably reduced porosity and surface imperfection in the areas where the rust powder was introduced. On the other hand, the joint with the mill scale added to it, resulted in complete elimination of porosity and no apparent surface imperfections whatsoever. Again, this elimination of porosity is due to the influence of the new bonded metallic deoxidizer upon the behavior of the basic welding composition.

Further advantage obtained with the invention is the easy, clean peeling slag produced over the weld. This characteristic yields a weld joint free from any residual composition which may require special treatment for removal.

What is claimed is:

1. Method of enriching a fused granulated submerged melt welding composition with a suitable metallic deoxidizer, which comprises first bonding metallic deoxidizer powder together with a carrier material to provide a prebonded dry granulated agglomerate the specific gravity of which is about the same as that of the fused granulated submerged melt welding composition, and randomly dispersing such granulated agglomerate in the fused granulated submerged melt welding composition, to avoid gross segregation between the resulting constituents.

2. Method of making submerged melt welding composition, which comprises preparing a dry granulated agglomerate composed of a metallic deoxidizer selected from the class consisting of ferro-silicon, silico-manganese, and ferrous alloy composed of aluminum and silicon, and a non-metallic carrier selected from the class consisting of MgO, $Al_2O_3$, and $CaF_2$; together with a suitable bonding agent selected from the class consisting of dextrose, corn starch, Portland cement, and silicate of soda, and adding such granulated agglomerate in a fused-granulated welding composition in such proportion as to yield 4%–5% of such metallic deoxidizer therein.

3. Electric arc submerged melt welding composition which comprises the combination of about 2%–15% prebonded granular additive substantially distributed in a fused granulated welding composition composed of MnO, $SiO_2$, $Al_2O_3$, $CaF_2$, CaO, MgO and FeO, said prebonded additive being composed of a powdered metallic deoxidizer selected from the class consisting of ferro-silicon, silico-manganese, and ferro-alloy and a non-metallic carrier selected from the class consisting of MgO, $Al_2O_3$, $CaF_2$, united with a bonding agent selected from the class consisting of dextrose, corn starch, Portland cement, and silicate of soda, the specific gravity of such additive being about equal to that of such granulated composition so that segregation of the former within the latter is avoided.

4. An enriched submerged melt welding composition, as defined by claim 3, wherein the grain size of the finely divided metallic particles is correlated with that of the welding composition such that the resultant mass is composed of randomly dispersed metallic particles in the welding composition.

5. Method of making a prebonded granular additive for fused granulated submerged melt welding composition having a certain specific gravity, which comprises mixing a dry-blended powdered metallic deoxidizer and carrier with a liquid bonding agent such as silicate of soda, then drying, and sizing such mixture to produce a product having about the same specific gravity as that of such composition.

6. Method of enriching a submerged melt welding composition which comprises mixing granular submerged melt welding composition having a certain specific gravity with a granular prebonded additive having about the same specific gravity as that of such composition, and mechanically blending such mixture to produce the final product in which by virtue of such specific gravities the additive does not settle in use.

7. Method of enriching submerged melt welding composition, which comprises adding a granular prebonded additive to the molten welding composition, then casting, drying, crushing and sizing the resulting mixture to produce the final product.

8. Method as defined by claim 7, in which the granular additive constitutes about 2%–15% weight of such product.

9. For fused submerged melt welding compositions, a granular additive composed of a dry granulated agglomerate of a powdered metallic deoxidizer selected from the class consisting of SiMn, FeSi, AlSiFe; and a non-metallic carrier selected from the class consisting of MgO, $Al_2O_3$, $CaF_2$, together with a suitable binder.

References Cited in the file of this patent

UNITED STATES PATENTS

| | | |
|---|---|---|
| 2,043,960 | Jones et al. | June 9, 1936 |
| 2,228,639 | Miller | Jan. 14, 1941 |
| 2,360,716 | Peters | Oct. 17, 1944 |
| 2,474,787 | Landis et al. | June 28, 1949 |
| 2,681,875 | Stringham et al. | June 22, 1954 |
| 2,814,579 | Stringham et al. | Nov. 26, 1957 |